(12) United States Patent
Chun et al.

(10) Patent No.: US 7,970,960 B2
(45) Date of Patent: Jun. 28, 2011

(54) DIRECT MEMORY ACCESS CONTROLLER AND DATA TRANSMITTING METHOD OF DIRECT MEMORY ACCESS CHANNEL

(75) Inventors: Ik-Jae Chun, Daejeon (KR); Jung-Hee Suk, Daejeon (KR); Tae-Moon Roh, Daejeon (KR); Jong-Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 211 days.

(21) Appl. No.: 12/262,412

(22) Filed: Oct. 31, 2008

(65) Prior Publication Data

US 2010/0017544 A1  Jan. 21, 2010

(30) Foreign Application Priority Data

Jul. 16, 2008  (KR) .................... 10-2008-0069127

(51) Int. Cl.
G06F 13/28 (2006.01)
(52) U.S. Cl. ............................. 710/22; 710/23
(58) Field of Classification Search .................. None
See application file for complete search history.

(56) References Cited

U.S. PATENT DOCUMENTS

| | | | | |
|---|---|---|---|---|
| 5,809,335 | A * | 9/1998 | Kamiya | 710/22 |
| 7,650,440 | B2 * | 1/2010 | Dawson et al. | 710/26 |
| 2009/0077272 | A1 * | 3/2009 | Hosoya et al. | 710/22 |

FOREIGN PATENT DOCUMENTS

| | | | |
|---|---|---|---|
| JP | 2002024157 A | * | 1/2002 |
| KR | 1020020097478 A | | 12/2002 |
| KR | 10-0441996 B1 | | 7/2004 |
| KR | 10-0499350 B1 | | 6/2005 |
| KR | 2006-0116729 A | | 11/2006 |
| KR | 1020070046694 A | | 5/2007 |
| KR | 2007-0098900 A | | 10/2007 |

OTHER PUBLICATIONS

Palmer, MJ, DMA Controller Channel Interlocking, Jan. 1, 1994, IBM Techincal Disclosure Bulletin, pp. 1-7.*
Nishimura, Translation of JP 2002-24157, Jan. 25, 2002, pp. 1-20.*

* cited by examiner

Primary Examiner — Eron J Sorrell
(74) Attorney, Agent, or Firm — Ladas & Parry LLP

(57) ABSTRACT

Provided is a direct memory access (DMA) controller. The DMA controller includes a plurality of channel groups and a channel group controller. Each of the channel groups has a plurality of DMA channels, and the channel group controller controls enablement of the DMA channels in units of channel groups. Herein, the channel group controller enables the DMA channels of at least one of the channel groups in data transmission.

8 Claims, 5 Drawing Sheets

DIRECT MEMORY ACCESS CONTROLLER AND DATA TRANSMITTING METHOD OF DIRECT MEMORY ACCESS CHANNEL

CROSS-REFERENCE TO RELATED APPLICATIONS

This U.S. non-provisional patent application claims priority under 35 U.S.C. §119 of Korean Patent Application No. 10-2007-0069127, filed on Jul. 16, 2008, the entire contents of which are hereby incorporated by reference.

BACKGROUND OF THE INVENTION

The present invention disclosed herein relates to a direct memory access (DMA) controller and a data transmitting method of a direct memory access channel.

Real-time multimedia applications are becoming more and more important. The real-time multimedia applications require a very high data processing rate of thousands of megabits per second. For high data processing rates, some processing systems use the uniprocessing architecture and others use the multiprocessing architecture. In multiprocessing systems, most sub-processors operate in parallel or at least in cooperation in order to achieve desired processing results.

Recently, the state-of-the-art computer applications are more and more complicated to meet an ever-increasing demand for processing systems. There is therefore an ever-increasing demand for a higher computer data processing rate. For example, in order to achieve desired results, graphic applications require a very large amount of data access, data computation, and data manipulation within a relatively short time. Therefore, the graphic applications require the highest demand for processing systems.

A direct memory access (DMA) scheme is used in some processing systems. A computer structure of such processing systems is designed to directly transmit data between a device and a memory without including any microprocessor for data transmission. Such a computer structure generally includes a memory controller for receiving a data transmission command from a system device requesting data transmission. A typical DMA command specifies a data block size, a virtual start address in a data-transmitting system memory, and a start address of a data-receiving device.

A typical DMA scheme can increase a data processing rate in comparison with an indirect memory access technology, but still has various limitations. For example, one or more sub-processors are necessary for applications for computation such as graphic processing using a multiprocessing system. However, such sub-processors generate many DMA commands in order to achieve all DMA data transmissions, thus increasing the processor load and reducing the processing capability. Also, in the typical DMA scheme, a DMA controller controls data transmission between a peripheral device and a memory. However, the efficiency of DMA transmission between memories connected to independent buses is required in the recent media processors.

SUMMARY OF THE INVENTION

The present invention provides a direct memory access controller (DMAC) that has improved channel control characteristics for rapidly processing a transmission request of large data between a signal processing device and a memory or between memories.

The present invention also provides a direct data transmission method of a system on chip including signal processing devices capable of efficient transmission of large data.

The present invention also provides a data transmission method that can efficiently perform DMA data transmission between memories connected to independent buses.

Embodiments of the present invention provide direct memory access (DMA) controllers including: a plurality of channel groups each having a plurality of DMA channels; and a channel group controller controlling enablement of the DMA channels in units of channel groups, wherein the channel group controller enables the DMA channels of at least one of the channel groups in data transmission.

In some embodiments, the DMA channels each provide a dual-port interface.

In other embodiments, the DMA channels are physically independent of each other.

In further embodiments, the channel group controller is configured such that external processors connected to the DMA controller control all of the DMA channels.

In still further embodiments, the number of the channel groups is m (m: an integer equal to or greater than 2) and the channel group controller includes: a crossbar switch switched such that an n (n: an integer equal to or greater than 2) number of processors are connected to one of the m channel groups; a plurality of register setting/controlling blocks configured to connect the n processors through the crossbar switch and to set or control a register for controlling the DMA channels of each of the m channel groups; and a plurality of register banks connected respectively to the register setting/controlling blocks and including registers storing information for controlling the DMA channels of each of the channel groups.

In still further embodiments, the DMA channels are physically independent of each other but are enabled while being set to a plurality of sub-channels.

In still further embodiments, the DMA controller automatically enables sub-channels necessary for data transmission by setting one sub-channel resister set in transmission of large data.

In other embodiments of the present invention, a data transmitting method of a DMA channel includes: setting one of a plurality of sub-channel register sets of the DMA channel; enabling a sub-channel according to the set sub-channel register set; and transmitting data according to the enabled sub-channel, wherein the rest sub-channels are automatically enabled according to the setting of the sub-channel register set in data transmission.

In some embodiments, the sub-channel register sets are set in transmission of a plurality of block data.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

A direct memory access controller (DMAC) according to the present invention classifies direct memory access (DMA) channels into a plurality of channel groups and controls the DMA channel, which belongs to at least one or more of the channel groups, to be enabled. Thus, a plurality of processors can simultaneously control the DMA channels of the different channel groups by using the DMAC of the present invention. Also, a system on chip using the DMAC of the present invention can reduce the control load of the processor in transmission of large block data.

Figure 1:
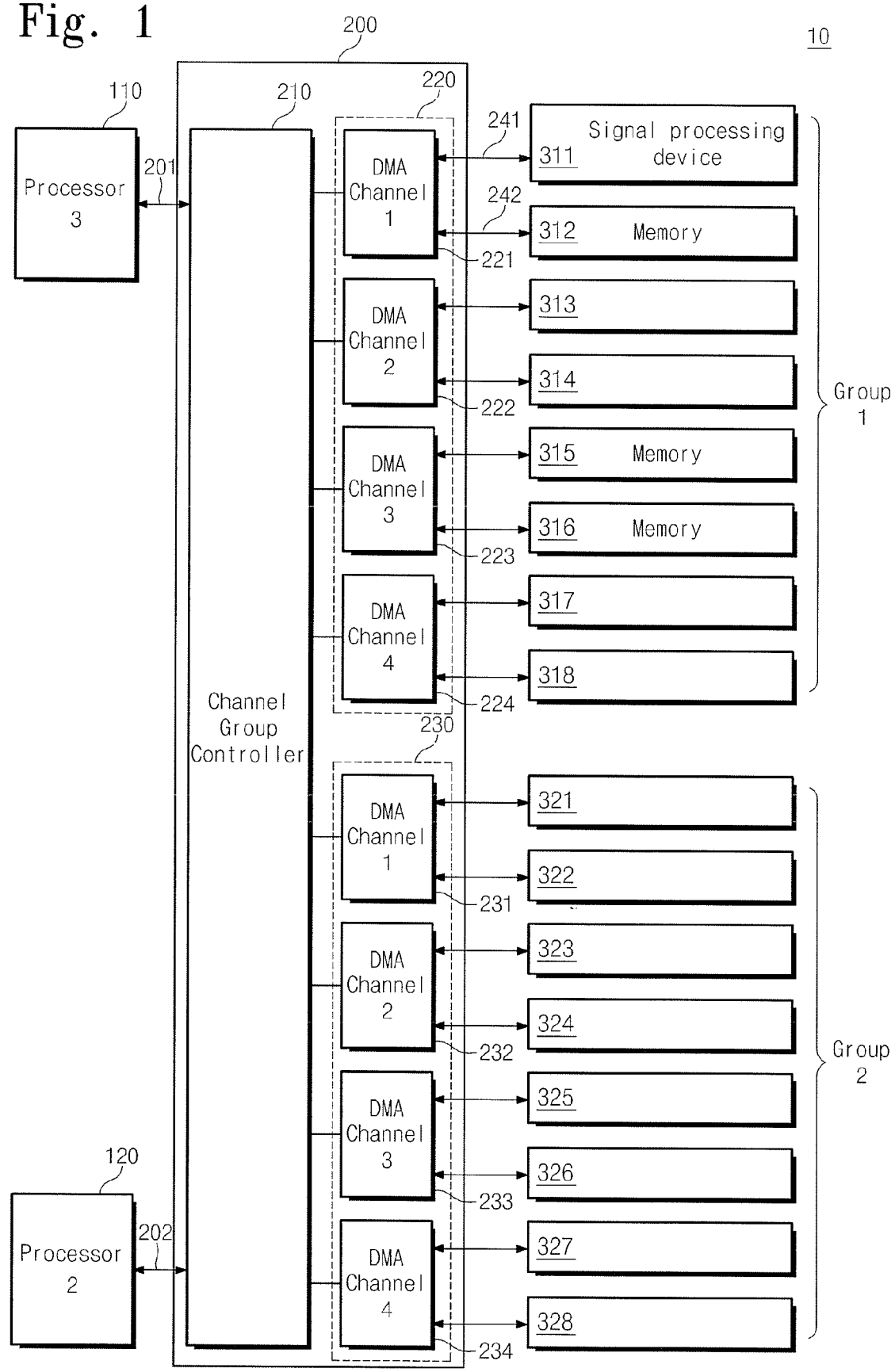
FIG. 1 is a block diagram of a system on chip according to the present invention.

FIG. 1 is a block diagram of a system on chip 10 with a DMAC 200 according to the present invention.

Referring to FIG. 1, the system on chip 10 includes processors 110 and 120 and data storage devices 311 to 318 and 321 to 328. Herein, memories and signal processing devices capable of data storage may be included in the data storage devices. In this case, such storage devices may be connected through a data transmission bus that may be connected to a DMA channel. The DMAC 200 is embodied such that a plurality of DMA channels are controlled in a grouping manner. As illustrated in FIG. 1, two processes 110 and 120 are connected to the DMAC 200, and a plurality of DMA channels 221 to 224 and 231 to 234 included in the DMAC 200 are classified into two channel groups 220 and 230. However, those skilled in the art will readily understand that the present invention is not limited to the configuration where the DMAC 200 are connected to only two processors and includes only two DMA channel groups.

The processors 110 and 120 are connected respectively through control interfaces 201 and 202 to the DMAC 200. Each of the processors 110 and 120 may independently control the DMA channels in units of channel groups. That is, the processors 110 and 120 may independently control data transmission between a first group of data storage devices 311 to 318 and a second group of data storage devices 321 to 328 through the DMAC 200.

The DMAC 200 controls the DMA channels so that data are transmitted directly between the data storage devices 311 to 318 and 321 to 328. For example, the DMAC 200 enables the first DMA channel 221 of the first channel group 220 in transmission of data between a signal processing device 311 and a memory 312. Thus, data are transmitted directly between the signal processing device 311 and the memory 312 under the control of the processor. Herein, the processor may be one of the first and second processors 110 and 120. Also, the DMAC 200 enables the third DMA channel 223 of the first channel group 220 in transmission of data between a memory 315 and a memory 316. Thus, data are transmitted directly between the memory 315 and the memory 316 under the control of the processor.

The DMA channels of the DMAC 200 are grouped into two channel groups. As illustrated in FIG. 1, the first channel group includes DMA channels 221, 222, 223 and 224 and the second channel group includes DMA channels 231, 232, 233 and 234.

A channel group controller 210 is embodied so that the DMA channels can be independently controlled in units of groups. The channel group controller 210 will be described later in detail with reference to FIGS. 2 and 3.

The DMA channels 221 to 224 and 231 to 234 are physically independent of each other and are embodied in a dual-port interface. That is, each of the DMA channels 221 to 224 and 231 to 234 has two master ports. For example, the first DMA channel 221 includes a first master port 241 and a second master port 242. Through the physically independent DMA channel structure with the dual-port interface, it is possible to efficiently perform DMA transmission between memories connected to a plurality of independent buses required in the recent media processor.

The data storage devices 311 to 318 and 321 to 328 are respectively connected to the DMA channels 221 to 224 and 231 to 234 through the master ports. Herein, the data storage devices 311 to 318 and 321 to 328 may be memories and signal processing devices capable of data storage, as illustrated in FIG. 1. The number of the data storage devices connectable to the DMA channel illustrated in FIG. 1 is two, i.e., one per each of the two master ports. However, it is not necessarily required that the storage device of the present invention is connected to each master port. When each master port is connected to a bus, the storage devices of the present invention may include signal processing devices or memories connected to the bus.

As described above, the DMAC 200 of the present invention is embodied such that the grouped DMA channels 221 to 224 and 231 to 234 are independently controlled. Thus, in the system on chip 10 with the DMAC 200, the processors 110 and 120 can independently control the data storage devices connected through the DMA channels 221 to 224 and 231 to 234 by using the DMAC 200.

Figure 2:
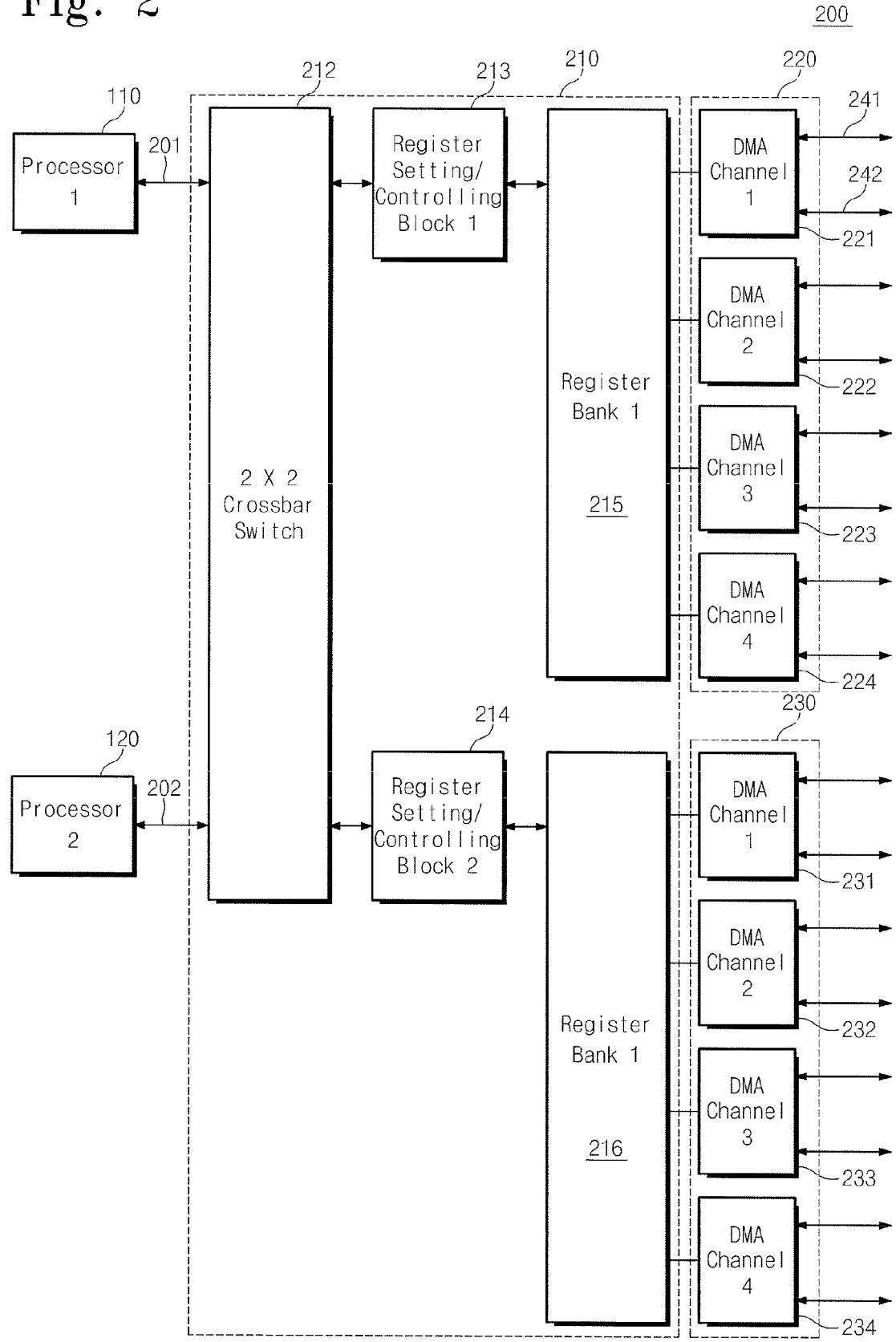
FIG. 2 is a block diagram illustrating an embodiment of a channel group controller of a DMAC in FIG. 1.

FIG. 2 is a block diagram illustrating an embodiment of the channel group controller 210 of the DMAC 200 in FIG. 1.

Referring to FIG. 2, the channel group controller 210 includes a crossbar switch 212, register setting/controlling blocks 213 and 214, and register banks 215 and 216. The channel group controller 210 controls register setting so that the processors 110 and 120 can independently control the DMA channels 221 to 224 of the first channel group 220 and the DMA channels 231 to 234 of the second channel group 230.

The crossbar switch 212 performs a switching operation so that each of the processors 110 and 120 connected by the control interfaces 201 and 202 is connected to one of the first and second register setting/controlling blocks 213 and 214. According to the operation of the crossbar switch 212, the processors 110 and 120 may control the first register setting/controlling block 213 or the second register setting/controlling block 214.

The first and second register setting/controlling block 213 and 214 store data received from the respective processors 110 and 120 in the first and second register banks 215 and 216. Herein, each register bank includes registers storing data for each DMA channel control.

Each of the first and second register banks 215 and 216 controls four DMA channels as illustrated in FIG. 2. The registers (not illustrated) of the register bank store operation settings of each channel, bus width settings, transmission direction settings, a source address, a destination address, and a transmission unit, which indicate an operation status of the DMAC 200.

The DMA channels 221 to 224 and 231 to 234 are enabled according to values set in the register banks 215 and 216. Thus, data transmission is performed between the data storage devices connected to the channel ports (e.g., 241 and 242) of the enabled DMA channel.

According to the present invention, the two different processors 110 and 120 can control the DMA channels 221 to 224 and 231 to 234 by using one of the first and second slave interfaces 201 and 202. That is, the processor 110 connected to the first slave interface 201 can access the first and second register setting/controlling blocks 213 and 214 according to a switching operation of the crossbar switch 212, and thus can set the first and second register banks 215 and 216.

Through the DMAC 200, the processors 110 and 120 can control eight DMA channels 221 to 224 and 231 to 234. Also, the first processor 110 can control the DMA channels 221, 222, 223 and 224 connected to the first register bank 215 through the crossbar switch 212 and simultaneously the second processor 120 can control the DMA channels 231, 232, 233 and 234 connected to the second register bank 216 through the crossbar switch 212. Thus, the DMAC 200 can simultaneously control the DMA channels necessary for the respective processors in data transmission of the different processors. Therefore, the DMAC 200 can reduce a time delay according to the DMA channel control of different processors.

The DMAC 200 includes a plurality of sub-channels for each physical DMA channel. That is, each physical DMA channel is regarded as several sub-channels. In this case, each sub-channel is controlled by control of a plurality of registers and each physical DMA channel is enabled according to the order of the set sub-channels. Examples of the registers constituting each sub-channel include a source address register, a destination address register, a channel linked list register, a channel control register, and a channel configuration register. The sub-channels prepare data transmission by setting the above-described registers, and the data transmission is performed by controlling each DMA channel in the designated order.

However, the typical DMAC has a problem in that sub-channel registers are frequently set by a processor in transmission of large block data. On the other hand, the DMAC 200 of the present invention sets a sub-channel register set one time in transmission of large block data, enables the DMA channel repeatedly according to the set sub-channel register set, and performs data transmission directly through the enabled DMA channel. Therefore, the system on chip 10 with the DMAC 200 can reduce the DMA channel control load of the processor in transmission of large block data and also can reduce the data transmission time.

Examples of registers included in the DMAC 200 for sub-channel setting include a source address register, a destination address register, an offset register, a channel control register, and a channel configuration register. Herein, the offset register has a source source address offset register and a destination source address offset register, and the channel configuration register has a bit area capable of storing a channel repetition value of the corresponding channel.

Figure 3:
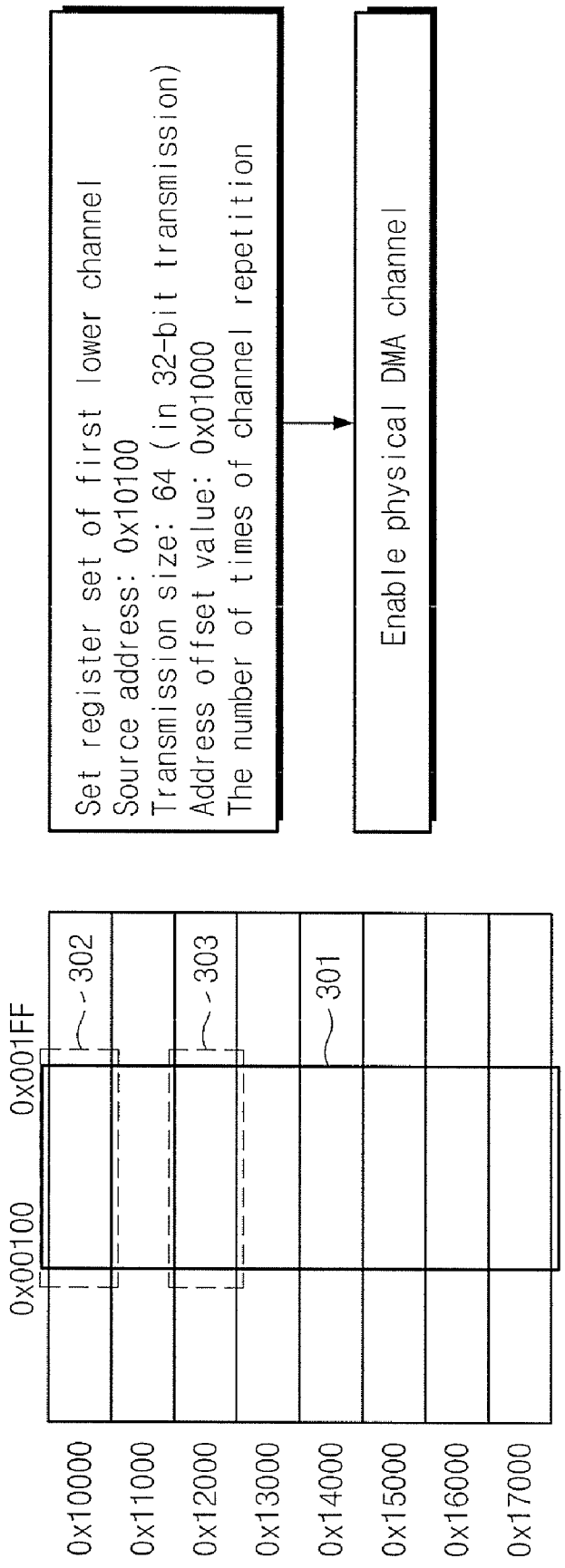
FIG. 3 is a diagram illustrating a method for enabling a lower channel of a DMAC according to the present invention.

FIG. 3 is a diagram illustrating a method for enabling a DMA channel of the DMAC 200 according to the present invention.

Referring to FIGS. 1 to 3, a DMA channel enabling method of the DMAC 200 is as follows. For convenience of description, it is assumed that each of the DMA channels 221 to 224 and 231 to 234 includes eight sub-channels. However, those skilled in the art will readily understand that the present invention is not limited to the configuration where the each of the DMA channels includes eight sub-channels.

It is assumed that the first to eighth sub-channels are sequentially enabled to transmit the entire data area 301. The DMA channel enabling method of the present invention sets only a register set enabling the first sub-channel in order to transmit data area 301. In this case, the rest sub-channels are sequentially enabled using information of the set register set of the first sub-channel.

In FIG. 3, a vertical axis represents an address value and a horizontal axis represents an offset value added to the address. Herein, the offset value ranges from 0×0 to 0×FF. An actual address of the data storage device is represented by the addition of the address value of the vertical axis and the offset value of the horizontal axis. For example, an actual address of a data area 302 ranges from '0×10100' to '0×101FF' and an actual address of a data area 303 ranges from '0×12100' to '0×121FF'. Each of the first to eighth sub-channels transmits data corresponding to an actual address obtained by the addition of an offset value to a source address.

For convenience of description, it is assumed that the data area 301 of the signal processing device 311 is transmitted to the memory 312 and this data transmission is controlled by the first processor 110. In this case, the data transmission is performed as follows.

First, the first processor 110 sets a register set of the first sub-channel of the first register bank 215 by using the DMAC 200. As illustrated in FIG. 3, a source address is set to '0×10100', a transmission size is se to 64 times in 32-bit transmission, a source address offset value is set to '0×01000', and the number of times of channel repetition is set to 8 times. Herein, if transmission is performed 64 times in 32-bit transmission, a total of 256-byte data are transmitted. This is data corresponding to addresses '0×100' to '0×1FF'.

The first sub-channel is enabled according to the setting of the register set of the first sub-channel, and 32-bit data (i.e., data corresponding to four addresses) starting from the source address 0×10100 are directly transmitted from the data storage device 311 to the memory 312 through the enabled first sub-channel. This operation is performed 64 times for the first sub-channel.

When the 64-time data transmission for the first sub-channel is completed, the first sub-channel reduces the channel repetition number value by 1, sets a new source address by addition of the set source address offset value '0×01000' to the preset source address '0×10100', and performs 64-time data transmission again. The first sub-channel transmits set transmission data by applying the channel repetition number set as described above.

Through the above-described process, data corresponding to the entire data area 301 are transmitted. This setting can also be applied to the rest sub-channels as well as to the first sub-channel.

The DMA channel enabling method of the DMAC 200 of the present invention sets a transmission size, a destination address, and a source address corresponding to a transmission area corresponding to a register of a sub-channel in transmission of large data, sets a source address offset value in an offset register, and sets a repetition number in a channel setting register to enable a DMA channel.

According to this DMA channel enabling method, the processor can easily transmit large block data by setting a small number of registers. Also, the source address offset value and the repetition number are set by the above-described DMA channel enabling method, thereby reducing the register setting time in comparison with the typical DMAC. In this case, the number of sub-channels may vary depending on the system configuration and the performance requirements.

Figure 4:
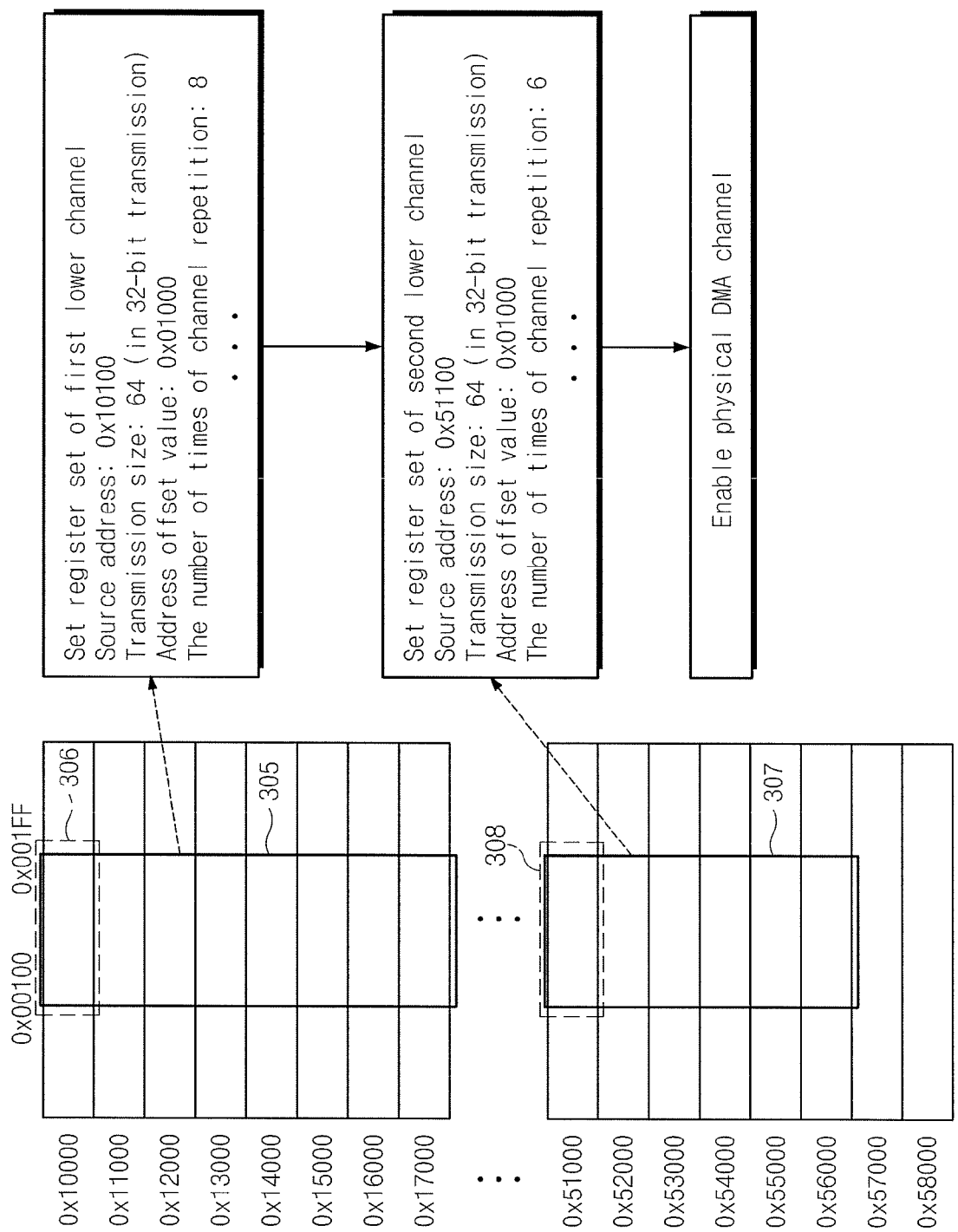
FIG. 4 is a bock diagram illustrating another method for enabling a lower channel of a DMAC according to the present invention.

FIG. 4 is a diagram illustrating a method for setting a lower channel for transmission of a plurality of block data. Referring to FIGS. 1 and 4, a DMA channel enabling method of the DMAC 200 is as follows.

In order to transmit a plurality of bock data, the DMA channel enabling method sets a transmission size, a destination address, and a source address corresponding to a transmission area in each register of sub-channels, sets the corresponding source address offset value in an offset register, and repeatedly performs setting in a channel setting register to enable a DMA channel.

For example, it is assumed that the DMAC 200 sets a register set of a first sub-channel for transmission of a data area 306 and a register set of a second sub-channel for transmission of a data area 308 in order to transmit a data area 305 and a data area 307. Referring to FIG. 4, in setting the resister set of the first sub-channel, a source address is set to '0x10100', a transmission size is set to 64 times in 32-bit transmission, a source address offset value is set to '0x0000', a channel repetition number is set to 8 times. Also, in setting the resister set of the second sub-channel, a source address is set to '0x51100', a transmission size is set to 64 times in 32-bit transmission, a source address offset value is set to '0x01000', a channel repetition number is set to 6 times. Accordingly, a physical DMA channel is enabled.

Although the DMA channels illustrated in FIG. 2 are grouped into two channel groups, it is not necessarily required that the DMA channels of the present invention are grouped into only two channel groups.

Figure 5:
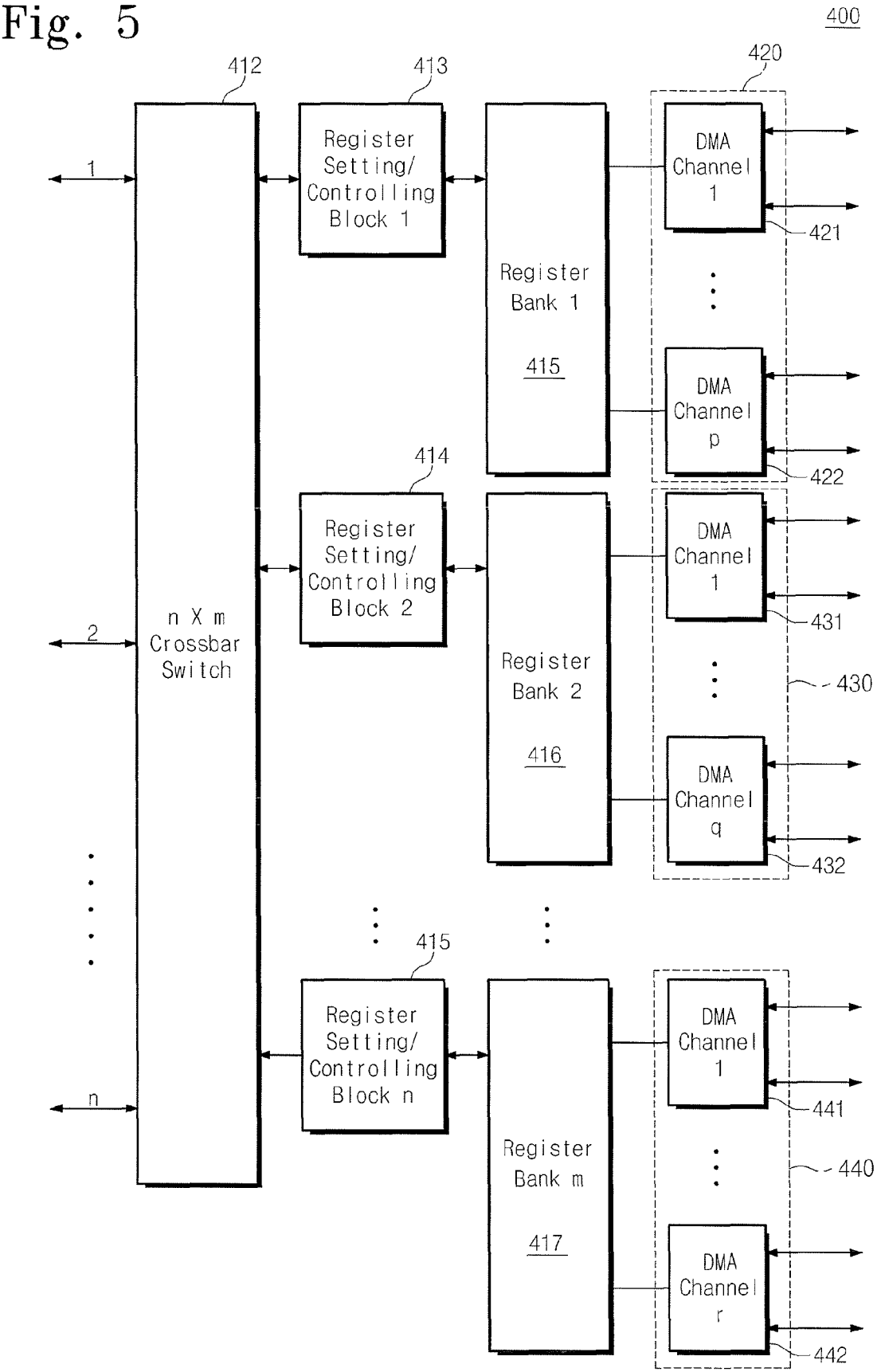
FIG. 5 is a block diagram illustrating another embodiment of a DMAC according to the present invention.

FIG. 5 is a block diagram of a DMAC 400 according to another embodiment of the present invention.

Referring to FIG. 5, a channel group controller 410 of a DMAC 400 is embodied such that an n number of processors (not illustrated) set DMA channels of an m number of channel groups 420, 430 and 440. Herein, the channel groups may be different in terms of the number of DMA channels. For example, the first channel group 420 includes a p number of DMA channels 421 and 422, the second channel group 430 includes a q number of DMA channels 431 and 432, and the third channel group 440 includes an r number of DMA channels 441 and 442. A crossbar switch 412 is switched such that the n processors are connected to one of an m number of register setting/controlling blocks 413, 414 and 415. Accordingly, the n processors can control an m number of register banks 416, 417 and 418. Also, the n processors can simultaneously control an m number of different register banks 416, 417 and 418.

The DMAC 400 of the present invention is embodied in such a way that a plurality of physically independent DMA channels are grouped into an m number of channel groups. Thus, the n processors can set DMA channels of the m channel groups independently.

As described above, the DMAC according to the present invention transmits large block data by simultaneously controlling a plurality of DMA channels by means of a plurality of processors. Thus, it is possible to reduce the control load of the processor in transmission of large block data.

Therefore, it is possible to provide the characteristics of rapid DMA transmission control in transmission of large multimedia data and in transmission of data in a system with a multiprocessor.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A direct memory access (DMA) controller comprising:
a plurality of channel groups each having a plurality of DMA channels,
wherein the each of the plurality of DMA channels has at least a first DMA Channel and a second DMA channel,
wherein the plurality of channel groups has at least a first channel group and a second channel group; and
a channel group controller controlling enablement of the DMA channels in units of channel groups,
wherein the channel group controller enables the respective DMA channel of the plurality of channel groups in data transmission,
wherein the channel group controller is configured to have at least two or more external processors connected to the channel group controller,
wherein any one of the at least two or more external processors is configured to control any one of the DMA channels, and
wherein a least two or more different external processors simultaneously control the at least first DMA channel and the second DMA channel of the respective one of at least the first or second channel group of the DMC controller or at least one of either the first DMA channel or the second DMA channel for each of the at least first channel group and the second channel group of the DMC controller.

2. The DMA controller of claim 1, wherein the DMA channels each provide a dual-port interface.

3. The DMA controller of claim 1, wherein the DMA channels are physically independent of each other.

4. The DMA controller of claim 1, wherein the number of the channel groups is m (m: an integer equal to or greater than 2) and the channel group controller comprises:
a crossbar switch switched such that an n (n: an integer equal to or greater than 2) number of the external processors are connected to one of the m channel groups;
a plurality of register setting/controlling blocks configured to connect the n processors through the crossbar switch and to set or control a register for controlling the DMA channels of each of the m channel groups; and
a plurality of register banks connected respectively to the register setting/controlling blocks and comprising registers storing information for controlling the DMA channels of each of the channel groups.

5. The DMA controller of claim 4, wherein the DMA channels are physically independent of each other but are enabled while being set to a plurality of sub-channels.

6. The DMA controller of claim 5, wherein the DMA controller automatically enables sub-channels necessary for data transmission by setting one sub-channel resister set in transmission of large data.

7. A data transmitting method of a direct memory access (DMA) channel, comprising:
setting one of a plurality of sub-channel register sets of the DMA channel;
enabling only one of the plurality of sub-channels according to the set sub-channel register set,
wherein the rest of the plurality of sub-channels are automatically enabled according to the setting of the sub-channel register set in data transmission; and
transmitting data from the plurality of sub-channels according to the enabled sub-channel channel.

8. The data transmitting method of claim 7, wherein the sub-channel register sets are set in transmission of a plurality of block data.

* * * * *